Figure 4:
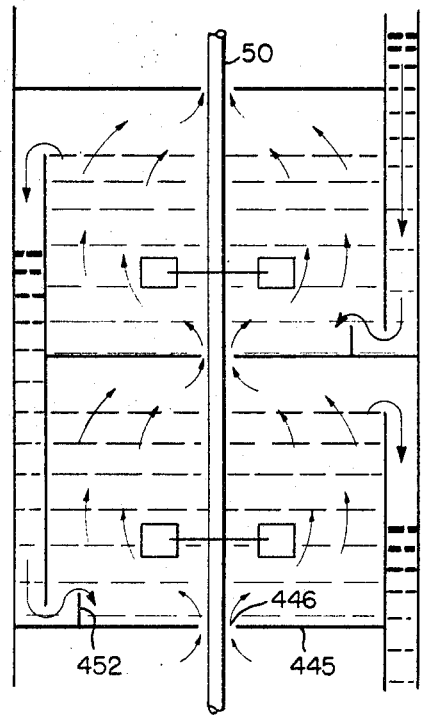

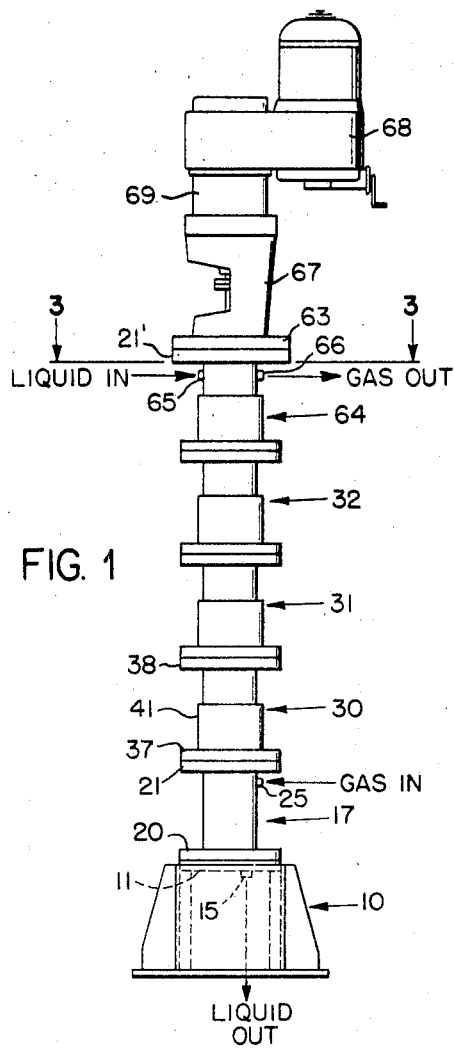
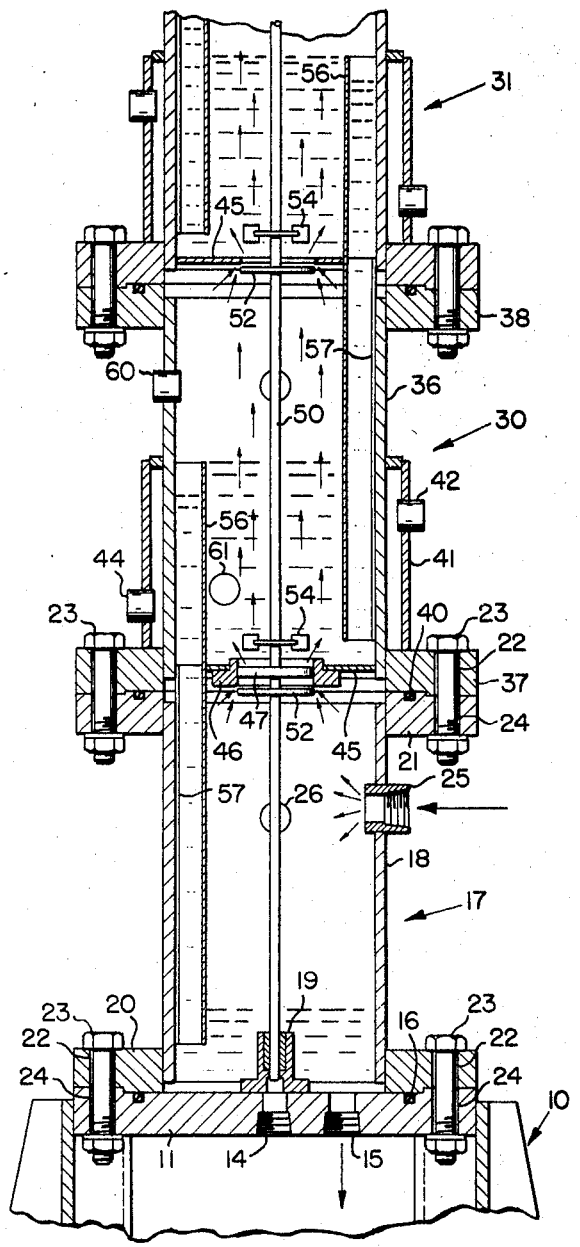
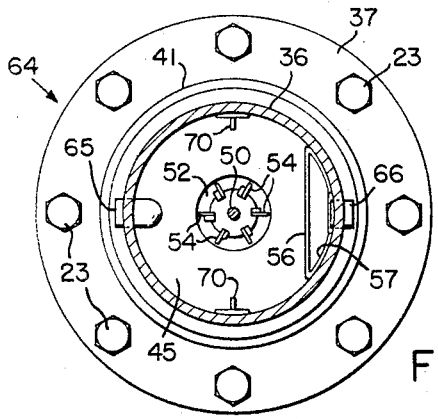
FIG. 1
FIG. 2
FIG. 3
INVENTORS
JAMES Y. OLDSHUE AND
HENRY E. HIRSCHLAND
BY
Cumpston & Shaw
THEIR ATTORNEYS

INVENTORS
JAMES Y. OLDSHUE AND
HENRY E. HIRSCHLAND
BY
THEIR ATTORNEYS

INVENTORS
JAMES Y. OLDSHUE AND
HENRY E. HIRSCHLAND

BY *Cumpston & Shaw*

THEIR ATTORNEYS

United States Patent Office 3,439,904
Patented Apr. 22, 1969

3,439,904
MULTISTAGE ABSORPTION COLUMN CONTACTOR FOR DISPERSING GAS IN LIQUIDS OR SLURRIES
James Y. Oldshue and Henry E. Hirschland, Rochester, N.Y., assignors to Mixing Equipment Co. Inc., Rochester, N.Y., a corporation of New York
Continuation of application Ser. No. 412,280, Nov. 12, 1964. This application May 16, 1966, Ser. No. 550,571
Int. Cl. B01f 3/04
U.S. Cl. 261—91                                12 Claims This application is a continuation of application S.N. 412,280, filed Nov. 12, 1964 and now abandoned, which was a continuation-in-part of our copending application S.N. 239,571, filed Nov. 23, 1962 and now abandoned.

This invention relates to apparatus for carrying out fluid contact processes, and particularly, liquid-gas contact processes. More particularly, the invention relates to apparatus for carrying out processes such as gas absorption and stripping, in which an intimate mutual contact must be obtained between a continuous liquid phase and a gas phase.

Several different types of equipment for carrying out these processes are available. However, in contact equipment where high gas velocities have been obtainable, it has not been practical in the past to obtain the superior efficiencies that would accrue from mechanical agitation; and in mechanically agitated contact devices, it has not been practical to attain in a single column the efficiencies that accrue from staging as in a bubble cap tower.

One object of the present invention is to provide an improved, practical liquid-gas contact apparatus.

A related object of the invention is to provide apparatus for carrying out an improved, practical, continuous process for obtaining intimate mutual contact between a liquid and a gas.

Another object of the invention is to provide a practical liquid-gas contact apparatus that permit much higher gas-to-liquid flow ratios and superficial gas velocities, with satisfactory operating efficiency, than those that are now obtainable in mechanically agitated contact devices.

A further object of the invention is to provide a practical liquid-gas contact apparatus that offers the advantage of high mixing intensities in the contact zones, to enhance the intimate mutual contact between gas and liquid.

Yet another object of the invention is to provide an improved, practical liquid-gas contact apparatus that provides superior efficiencies for carrying out chemical reactions, for absorption, for stripping, and the like.

A more specific object of the invention is to provide a practical, continuous, multistage liquid-gas contact column that can be operated at high efficiency, at relatively high throughput rates for both the gas phase and the liquid phase for the size of the equipment that is required, and that is relatively simple to construct and easy to maintain.

Other objects of the invention will be apparent hereinafter from the specification and from the recital of the appended claims. To these and other ends, the invention resides in part in certain improvements and combinations of parts, all as will hereinafter be more fully described, the novel features of the equipment of this invention being pointed out in the claims at the end of this specification.

In the drawings:
FIG. 1 is a side elevation of a continuous, multistage liquid-gas contact column that is constructed in accordance with one embodiment of this invention;
FIG. 2 is a fragmentary somewhat schematic axial section, on an enlarged scale, of the lower portion of the column shown in FIG. 1, the small arrows in this and other figures being used to depict gas flow;
FIG. 3 is a section, on an enlarged scale, taken on the line 3—3 of FIG. 1, looking in the direction of the arrows;
FIGS. 4–8 are fragmentary schematic diagrams showing in axial section two intermediate stages of continuous, multistage liquid-gas contact columns that are constructed in accordance with various embodiments of this invention;
FIG. 9 shows a schematic fragmentary top view of a cross section of a column according to the invention.

Referring now in detail to the drawings by numerals of reference, and particularly to FIGS. 1–3, the numeral 10 denotes generally a base upon which the column is mounted. A generally circular base plate 11 is supported in a horizontal position at the top of the base 10. This base plate 11 is formed with a central opening 15 therethrough that is tapped for connection to a liquid drain line (not shown). A bearing assembly 19 is mounted on the base plate 11 directly over the central opening 14, to permit access to the bearing assembly through this opening. An O-ring 16 is mounted in a groove in the upper face of the base plate 11.

A bottom stage, that is generally denoted by the numeral 17, is mounted on the base plate 11, and intermediate stages 30, 31, and 32, and the top stage 64, are mounted one over the other, in the order named, to extend in a column over the bottom stage. The bottom stage 17 is formed from a generally cylindrical pipe section 18 that has flanges 20, 21, secured at its lower and upper ends respectively. The lower flange 20 is engaged against the upper face of the base plate 11 and against the O-ring 16, to compress the O-ring to form a liquid-tight seal. The flange 20 and the base plate 11 are formed with aligned openings 22, 24 respectively, through which bolts 23 are fastened to secure these parts together.

A bushing 25 is mounted in a hole in the wall of the pipe 18, to communicate with the bore of the pipe, and to serve as a gas inlet for the column. A bullseye 26 is also mounted in the wall of the pipe 18, to permit visual inspection of the interior of the bottom stage 17.

While three intermediate stages 30, 31, and 32, are shown in the drawings, any desired number of intermediate stages can be used, to provide a column of the desired capability and capacity. The intermediate stages are substantially identical in construction and function. Thus, for example, the first intermediate stage 30 is formed from a generally cylindrical pipe section 36 that has flanges 37, 38 at its lower and upper ends respectively. The lower flange 37 is engaged against the upper flange 21 of the bottom stage, and an O-ring 40 is inserted between the confronting flange faces, in a groove in the face of the lower flange, to form a seal between the stages. The flanges of these stages are fastened together by bolts 23. A jacket 41, that is equipped with an inlet fitting 42 and a discharge fitting 44, is mounted around the lower part of the stage to permit heating or cooling of the stage.

A generally ring-shaped separator plate 45 is secured across the bore of the pipe 36 adjacent the lower end of the stage 30. The separator plate 45 is formed with a central opening in which a bearing bushing 46 is secured. A bearing 47 is mounted in the bore of this bushing. A shaft 50, that extends axially of the column, is journaled in the bearing 47 and also in the bearing assembly 19 that is mounted on the base plate 11 in the bottom stage.

A generally circular disc 52 is secured to the shaft 50 below the separator plate 45, for rotation with the shaft, and in close proximity to the mouth of the bore of the bearing bushing 46. An impeller assembly 54 is secured to the shaft above the separator plate 45, for rotation with the shaft, and immediately above the upper end of the bore of the bushing 46.

The separator plate 45 terminates at one side of the column along a chord that lies in a plane that is parallel to the axis of the column, and a downcomer assembly is mounted in the space between this edge of the plate 45 and the interior wall surface of the pipe 36. The downcomer assembly comprises an upright piece of sheet metal 56 that is secured in fluid-tight fashion to the edge of the plate 45 and also to the surface of the pipe 36 along its opposite lateral edges, and a shorter piece of sheet metal 57 that is curved to be generally semi-circular in horizontal section, and that is secured along its upright lateral edges to the lateral edges of the larger sheet metal piece 56 and to the inner surface of the pipe 36. That portion of the sheet metal piece 56 that projects above the level of the separator plate 45 forms a weir or overflow for the stage, and that portion of the downcomer assembly that projects into the bottom stage 17 forms a conduit that provides communication with the bottom stage at a location in the bottom stage that is in close proximity to the face of the base plate 11 and that is below the normal level of liquid in the bottom stage.

A bushing 60 is mounted in a hole in the wall of the pipe 36, above the level of the weir 56, to provide a tap to permit the withdrawal of gas from this stage. A bushing 61 is mounted in a hole in the wall of the pipe 36 below the level of the weir 56, to provide a tap to permit the withdrawal of liquid from this stage.

The second intermediate stage 31 is generally similar in construction to the first intermediate stage 30, the one important difference in structure being in the ommission of the bearing bushing and bearing from the separator plate. These are used in the construction of the column only where they are necessary to steady the shaft. In the several stages of the column, like numerals are used in the drawing to denote like parts.

The top stage 64 is generally similar in construction to the intermediate stages, but differs in that it is formed with an inlet line 65 through which liquid is admitted to the column, and an outlet line 66 through which gas is discharged from the column. The liquid inlet line 65 preferably is projected within the top stage below the normal liquid level for that stage, and the inner end of the gas discharge line 66 is disposed above the normal liquid level.

As can be seen in FIG. 3, a pair of baffles 70 are mounted diametrically opposite each other, on the upper surface of the plate 45 of each of the intermediate and the top stages, equidistantly from the weir 56, to control the pattern of fluid flow and of mixing in these stages.

An assembly 67 is mounted at the upper end of the column over the top stage 64, to seal off the upper end of the column, and to provide a mounting for a motor 68 and gear reduction 69, for driving the shaft.

The top stage 64 is formed with an upper flange 21 that is somewhat larger than the upper flanges of the intermediate stages, to provide a bearing area for supporting the flange 63 at the base of the assembly 67.

In use of the column, liquid material in the form of a liquid or a slurry is supplied to the column through the inlet line 65 in the top stage 64, and gas under pressure is supplied to the column through the gas inlet 25 in the bottom stage 17. When the column is operating in an ordinary manner, the liquid or liquid material in each stage of the column is maintained at the height of the weir 56 in that stage. The continuous supply of liquid to the column causes the liquid to overflow and to pass through the downcomer to the next lower stage, and this process occurs serially down the length of the column, until the liquid accumulates in the bottom stage and is withdrawn from the column through the liquid outlet 15.

The gas that is forced into the bottom stage 17 of the column is under sufficient pressure so that it passes through the clearance passage between the rotary disc 52 and the bushing 46, up through the bore of the bushing 46 and through the bearing 47, into the pool or body of liquid in the first intermediate stage 30. The gas pressure is sufficiently high substantially to prevent any escape of the liquid from the pool in the first stage through the bore of the bearing bushing 46. As the gas passes into the pool of liquid, it is forced into intimate contact with the liquid by the action of the impeller assembly 54. The mixture of gas bubbles and liquid that is obtained is kept highly agitated by the action of the impeller assembly. The gas progresses upwardly through the liquid and passes into the space above the level of the liquid. The gas then continues its upward passage through the column, passing through the clearance space between the rotary disc 52 and the separator plate 45 of the second intermediate stage 31, and into the pool of liquid in that stage.

The action of the impeller assembly in each stage serves to break up the upwardly moving gas into diverse small streams. This action prevents undesirable channeling of the gas through the liquid, which would reduce contact time and make the column less efficient. The impeller action also diverts the gas and causes it to move with a horizontal velocity component, so that it does not simply rise straight up through the liquid. This prolongs the time of contact between the gas and the liquid in each stage. At the same time, the many small bubbles of gas that are driven into the liquid by the impeller action are maintained in a dispersed condition in the liquid, and the mixture of the liquid and the gas bubbles is kept highly agitated by the high intensity mixing impeller action.

The maintenance of a volume of gas above the pool of liquid in each stage permits the liquid and gas phases to separate from each other, so that the gas that passes from one stage to the next is substantially free from entrained liquid.

The throughput rate and capacity of a column that is built in accordance with this invention will depend upon the fluid materials that are being processed, the temperatures used, the size of the various openings and clearances, and the like. With proper adjustments and controls, a column that is constructed in accordance with the present invention can be operated at any desired ratio of gas flow to liquid flow. However, the greatest field of application will probably be found where the ratio of gas flow to liquid flow is above a 7 to 1 ratio, by volume.

For columns of modest height, the stages can be substantially identical in construction. However, for columns in which an appreciable pressure drop may be experienced through the column, the size of the clearance that admits gas to each stage may be adjusted as necessary for good operation of the column.

The height of liquid in each stage must be sufficient so that the level of liquid in the downcomer is sufficiently high to form a liquid seal, to prevent the passage of gas upwardly through the downcomer. In general, the depth of liquid in the pool of liquid in a stage should have a ratio of at least 0.33 to the diameter of the column, in order to obtain a proper flow pattern within the column. The impeller preferably is located somewhere in the region from just above the gas inlet to a point about midway of the depth of the liquid, but may be located outside this region if desired. In addition, more than one impeller per stage may be used if desired.

Heat exchange with the fluids can be effected with each stage individually, or with all stages substantially uniformly, as process needs dictate.

Referring now in detail to FIG. 4, the construction of the intermediate stages in this embodiment of the invention is modified in that the separator plate 445 of each stage is formed with a generally circular central opening 446 through which the shaft 50 passes with just sufficient clearance to permit a regulated passage of gas from the subjacent stage up through the opening 446 into the liquid on the separator plate. Baffles 452 are mounted to extend across the upper surfaces of the separator plates 445 respectively. These baffles 452 are disposed across the discharge openings of the downcomers, respectively, to prevent any tendency for the liquid to be pumped up the downcomers by the action of the impellers. In operation, the action of this modified column is similar to that of the column illustrated in FIGS. 1–3. The pressure of the gas in each stage is sufficient to cause the gas to pass upwardly through successive stages in the column and to prevent the liquid from flowing down the column, along the shaft.

Figure 5:
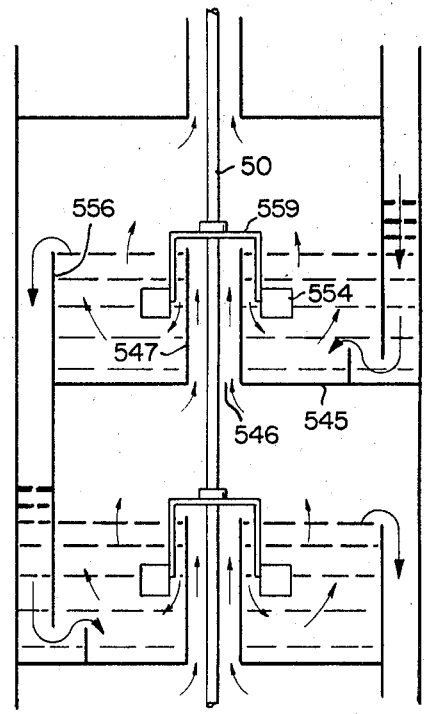

Referring now in detail to FIG. 5, the separator plate 545 is formed with a generally circular, central opening 546, and a stand pipe 547 is secured to the upper surface of the plate to project upwardly to a point above the level of the weir 556, and with its bore communicating through the opening 546 with the subjacent stage. A deflector 559, that is generally in the shape of an inverted cup, is secured to the shaft 50 so that it is spaced from the upper end of the stand pipe 547 and projects downwardly, about the stand pipe, to a level that is below the top of the weir. The impeller blades 554 are secured in angularly spaced relation about the skirt of the deflector 559, which serves as a hub for the impeller assembly.

In operation of the column that is illustrated in FIG. 5, the liquid fills each stage to the level of its respective weir, so that the lower portion of the deflector 559 is beneath liquid level. Gas under pressure moves up the column from the gas space in one stage, up through the bore of the stand pipe, then down and out under the skirt of the deflector 559 into the liquid. As the shaft 50 is rotated, the deflector 559 and the impeller vanes 554 are rotated, so that the liquid in the stage is kept in a state of agitation, and the gas that is passed into the liquid is mechanically forced into intimate contact with the liquid by the action of the impeller vanes, and streaming or channelling of the gas stream through the liquid is prevented, and large bubbles are broken up into small bubbles. The result is an improved mutual intimate contact between the gas and the liquid in each stage. As in the other columns, any liquid that is entrained in the gas can drop out in the gas space in each stage, above the liquid level.

The column structure that is illustrated in FIG. 5 has the advantage that there is an effective liquid seal within the column even when no gas is flowing. In addition, the column can be brought to an equilibrated state promptly at startup, since a pool of liquid is retained in each stage when the column is not in operation, and does not drain down to the bottom of the column when the gas pressure is stopped or interrupted.

Figure 6:
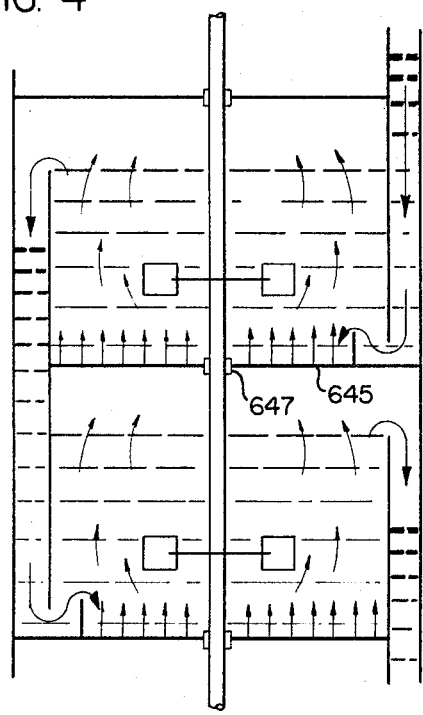

Referring now in detail to FIG. 6, the separator plate 645 is formed with a central opening that accommodates a bearing 647 that steadies the shaft and that does not permit any substantial passage of gas upwardly through the bearing. The separator plate 645 itself is formed with a plurality of perforations that are spaced from each other, to permit the passage of gas upwardly through the plurality of openings in the separator plate, at spaced locations over the surface of the separator plate. In operation of this column, the gas under pressure from the gas space in one stage passes up through the openings in the separator plate of the next stage, directly into the pool of liquid that is held on the upper surface of the separator plate of that stage. The action of the impellers again achieves an intimate mutual contact between the gas and the liquid, preserves a mixing pattern in the liquid-gas mixture, prevents the formation of inactive pockets of liquid, and keeps the gas broken up into small bubbles in diverse streams.

Figure 7:
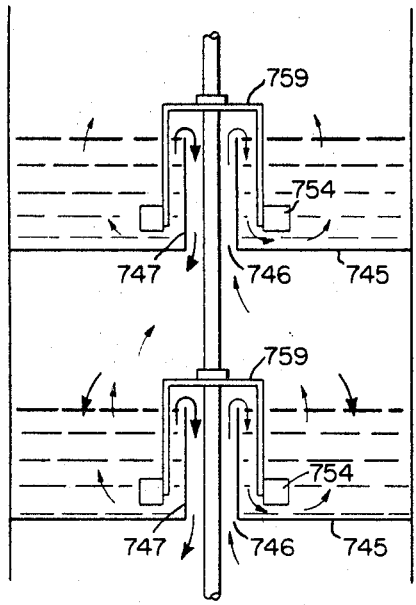

Referring now in detail to FIG. 7, the separator plate 745 is formed with a generally circular, central opening 746 surrounded by an upright annular wall 747 to form a stand pipe similar to that of the column embodiment of FIG. 5. The column illustrated in FIG. 7 differs from the embodiment of FIG. 5 in that peripheral weirs and downcomers are omitted and wall 747 functions both as a weir and a downcomer. Not only does gas rise upward through opening 746, but liquid spills over the top of wall 747 and passes downward through the same central opening 746 to the next lower compartment.

Rising gas is directed downward by inverted cup member 759 and introduced to the liquid in an area below the surface of the liquid and preferably near the bottom of the liquid where it is mixed into intimate contact with the liquid by the impeller 754 in a manner the same as that described above for FIG. 5. The inventive column is adapted for violent mixing agitation of the liquid in each pool so that the gas and liquid are mixed into intmiate mutual contact relatively independently of the liquid flow path.

Figure 8:
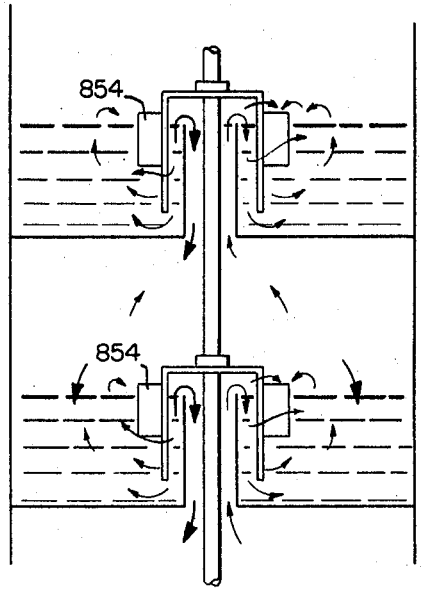
Figure 9:
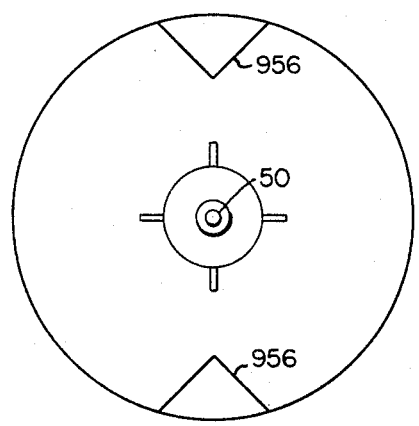

The embodiment of FIG. 8 is similar to that of FIG. 7 with the exception of the operation of the impeller 854. The schematically illustrated impeller 854 is shown as breaking the surface of the liquid in each compartment. Impeller 854 is preferably designed to draw gas from above the surface of the liquid in each compartment down into the liquid and into intimate contact therewith. Thus, gas rising from the surface of liquid in a compartment does not necessarily immediately escape to the next higher compartment, but may be drawn back down into the liquid by the action of impeller 854. Also, with the impeller of FIG. 8, it is not necessary to introduce the gas to each successive stage near the bottom of the pool of liquid. Accordingly, impeller 854 is shown as having slots or perforations in its outer cup wall through which gas escapes into the liquid or over the surface of the liquid. Since gas is drawn down into the liquid by impeller 854, the gas passing over the surface of the liquid is mixed into intimate contact with the liquid to the same extent as gas introduced near the bottom of the pool.

Alternatively, impeller 854 can be formed as a disk arranged over the central opening of the stage separator and having peripheral vanes or blades cutting the surface of the liquid for drawing gas down into the liquid and accomplishing the desired mixing. Impeller 854 must be solid over the extent of the central opening to prevent liquid from falling through a stage without entering the mixing pool. Of course, impellers of the type represented by impeller 854, that draw gas down into a pool of liquid from over the surface of the liquid can be used with other column embodiments such as those schematically represented in FIGS. 4 or 5.

Impeller 854 as well as the impellers of all the various embodiments of the invention, can be driven rotatively, reciprocally, vertically, or in any known motion to achieve the desired intimate mixing.

Internal weirs according to the invention can also function as vertical baffles to prevent circular motion or swirling of liquid in the pools, and with properly constructed weirs, other baffles can be eliminated to effect a further saving in column construction. As schematically shown in FIG. 9, weirs 956 are formed of vertically oriented angle irons so as to function as baffles in addition to weirs and downcomers. Of course, weirs 956 can be formed in other convenient baffling shapes. Thus, weirs 956 afford a significant saving because not only are internal weirs generally less expensive than external piping, but internal weirs can provide the baffling necessary for rotationally driven impellers.

Liquid-gas contact columns that are constructed in accordance with the present invention provide the advantage of high mixing intensities in each stage, an advantage that is not now available in present equipment. Moreover, columns that are constructed in accordance with this invention permit much higher gas flow to liquid flow ratios and superficial gas velocities than are attainable in presently available contact devices in which mechanical agitation is provided.

Columns that are constructed in accordance with this invention are useful for a wide variety of liquid-gas contact applications, including both gas absorption and stripping. The term "stripping" is employed herein to refer to a process that is essentially negative gas absorption, that is, a process that involves bringing a liquid containing a dissolved gas into contact with an inert or insoluble gas in order to remove or "strip" the dissolved gas from the liquid. Columns constructed in accordance with this invention also have application in carrying out chemical reactions, and, as well, in the distillation field, where improved plate efficiencies can be obtained because of the high mixing intensities that are obtained in each stage.

Another advantage of contact columns, that are constructed in accordance with the present invention, is that the effect of the manner of introducing the gas into each stage, and agitating it, is to obtain in each stage a tremendous area of gas-liquir contact and a prolonged period of contact. Conditions for effective interchange for absorption, stripping, washing, and the like, are thus optimized.

While the invention has been described in connection with liquid-gas contact processes and devices, the invention is generally applicable to contact between any fluids or slurries of differing densities.

While the invention has been disclosed herein by reference to the details of preferred embodiments of the invention, it is to be understood that such disclosure is intended in an illustrative rather than in a limiting sense, and it is contemplated that various modifications in the construction and arrangement of the parts will readily occur to those skilled in the art, with the spirit of the invention and the scope of the appended claims.

We claim:

1. An apparatus for effecting contact between liquid material and gaseous material, which comprises:
    (a) means forming an enclosed lower compartment and an enclosed upper compartment with a predetermined liquid level therein below the top thereof;
    (b) means for introducing liquid material into said upper compartment;
    (c) means for introducing gaseous material into said upper compartment;
    (d) means for withdrawing gaseous material from said upper compartment;
    (e) means for withdrawing liquid material from said lower compartment;
    (f) an impeller disposed in the region of the bottom of said upper compartment substantially below the level of said liquid material in said upper compartment;
    (g) means for rotating said impeller in said liquid material so that said impeller tends to impart a swirling motion to said liquid material; and
    (h) weir means for receiving said liquid material at said level in said upper compartment and for introducing said liquid material into said lower compartment, said weir means being disposed at the periphery of said upper compartment and extending from said level in said upper compartment to said lower compartment, said weir means comprising a conduit having a substantial, generally vertically disposed surface oriented to face against said swirling motion of said liquid material in opposition thereto, and extending generally radially inward from said periphery into said body of liquid material a distance sufficient to substantially obstruct said swirling motion.

2. An apparatus according to claim 1 wherein said weir means comprise a vertically oriented angle iron with the ends of its legs fastened to the inside periphery of said compartment and with the apex thereof facing outwardly into said compartment.

3. An apparatus for effecting contact between liquid material and gaseous material, which comprises:
    (a) means forming a column having a top end, a bottom end, a vertically disposed longitudinal axis and from said bottom end to said top end, a series of superposed compartments on top of a bottom compartment, each of said superposed compartments having predetermined liquid levels therein;
    (b) means for introducing liquid material into the top compartment of said series;
    (c) means for introducing gaseous material into said bottom compartment;
    (d) means for withdrawing gaseous material from each compartment below said top compartment and for introducing it into the compartment above said each compartment;
    (e) means for withdrawing gaseous material from said top compartment above its predetermined liquid level;
    (f) means for withdrawing liquid material from said bottom compartment;
    (g) a rotatable impeller disposed on said axis in each one of said superposed compartments substantially below the level of said liquid material in each of said compartments for vigorously agitating said body of liquid material contained therein under normal operative conditions;
    (h) means for rotating said impeller in said body of liquid material so that said impeller tends to impart a swirling motion to said body of liquid material; and
    (i) weir means for receiving said liquid material at the predetermined level in each one of said compartments and for introducing said liquid material into a lower compartment, said weir means in each one of said superposed compartments being disposed at the inside periphery of said column and extending from said predetermined liquid level to a subjacent compartment, said weir means comprising an open ended conduit having a substantial, generally vertically disposed surface oriented to face against said swirling motion of said liquid material in opposition thereto, and extending generally radially inwardly from said periphery into said body of liquid material a distance sufficient to substantially obstruct said swirling motion of said body of liquid material.

4. An apparatus according to claim 3 wherein said weir means comprise vertically oriented angle irons with the ends of the legs thereof joined to the peripheries of said compartments and with the apices thereof projecting into said compartments.

5. An apparatus for effecting contact between liquid material and gaseous material, which comprises:
    (a) means forming an enclosed compartment having a top, a bottom and a predetermined liquid level in said compartment below said top;
    (b) means for introducing liquid material into said compartment;
    (c) weir means for withdrawing liquid material from said compartment at said liquid level;
    (d) rotatable impeller means disposed on a normally vertical axis of rotation in said compartment, said impeller means comprising an inverted, cup-shaped member with impeller blades secured to the outside of said member, said member and blades extending above and below said level, said member having perforations in the side wall above and below said level, and said blades in operation drawing gaseous material from above said level to below said level;
    (e) means for introducing gaseous material into the interior of said inverted cup-shaped member; and
    (f) means for withdrawing gaseous material from said compartment above said liquid level.

6. In a multi-stage absorption column contactor for dispersing gas in a continuous phase of liquid material, said column contactor having a generally upright shell, a stage separator plate secured within said shell and extending across said shell to divide said shell into an upper compartment and a lower compartment, a generally upright, rotatable drive shaft extending through said upper and lower compartments, said stage separator plate having an aperture through which said drive shaft passes, means for introducing liquid material into said upper compartment, means for withdrawing liquid material from said lower compartment, means for introducing gas into said lower compartment, and means disposed in the region of the top of said upper compartment for withdrawing gas from said upper compartment, the improvement comprising:

(a) a generally upright stand pipe joined to said stage separator plate and surrounding said drive shaft and said aperture in said stage separator plate to afford a passageway between said upper and lower compartments, said standpipe extending continuously a substantial distance above said stage separator plate to retain a pool of said liquid material of substantial depth in said upper compartment;

(b) a gas deflector secured to said drive shaft above said standpipe, said deflector having a closed top portion extending radially outward from said drive shaft and radially beyond said standpipe, and a downwardly extending closed skirt portion integral with said top portion and extending a substantial distance below the top of said standpipe;

(c) a plurality of impeller blades mounted on said skirt portion in the region of the bottom thereof, said blades extending generally radially from said skirt portion, and the tops of said blades being spaced a substantial distance below the top of said standpipe; and (d) means for rotating said drive shaft to rotate said blades rapidly in said pool of liquid material to both pump and shear said liquid material vigorously so that gas passing up through said standpipe and deflected downward a substantial distance below the level of said liquid material to the region of said impeller blades is intimately dispersed into said liquid material.

7. The column contactor of claim 6 including a plurality of said stage separator plates forming a plurality of compartments, superjacent ones of which comprise said upper compartment, and subjacent ones of which comprise said lower compartment.

8. The column contactor of claim 6 including means communicating with said liquid material for baffling swirling motion of said liquid material.

9. The column contactor of claim 6 including a downcomer conduit joined to said stage separator plate in the region of the inside periphery of said shell and extending continuously a substantial distance above said stage separator plate to a level slightly below the top of said standpipe, the top of said downcomer conduit determining the level of said liquid material in said upper compartment, and said downcomer extending downward from said stage separator plate to the region of the bottom of said lower compartment to guide liquid spilling over the top of said downcomer conduit down to the region of the bottom of said lower compartment.

10. The column contactor of claim 9 including a baffle wall extending upward from the bottom of said lower compartment adjacent and radially inward of the bottom of said downcomer.

11. The column contactor of claim 10 including a plurality of said stage separator plates forming a plurality of compartments, superadjacent ones of which comprise said upper compartment and subjacent ones of which comprise said lower compartment.

12. The column contactor of claim 11 including baffle plates mounted on the inside periphery of said shell and extending generally radially inwardly into said compartments to baffle swirling motion of said pools of liquid material.

References Cited
UNITED STATES PATENTS

| | | | |
|---|---|---|---|
| 784,556 | 3/1905 | Gerdes | 261—91 |
| 2,029,277 | 1/1936 | Scoville | 261—114 |
| 2,055,065 | 9/1936 | Booth. | |
| 2,722,505 | 11/1955 | Faulkner. | |
| 2,764,536 | 9/1956 | Hutchins | 202—160 XR |
| 2,779,537 | 1/1957 | Madany | 23—270.5 XR |
| 2,847,200 | 8/1958 | Ung | 261—84 |

TIM R. MILES, *Primary Examiner.*

U.S. Cl. X.R.

23—270.5; 261—93, 114